Patented Oct. 4, 1932

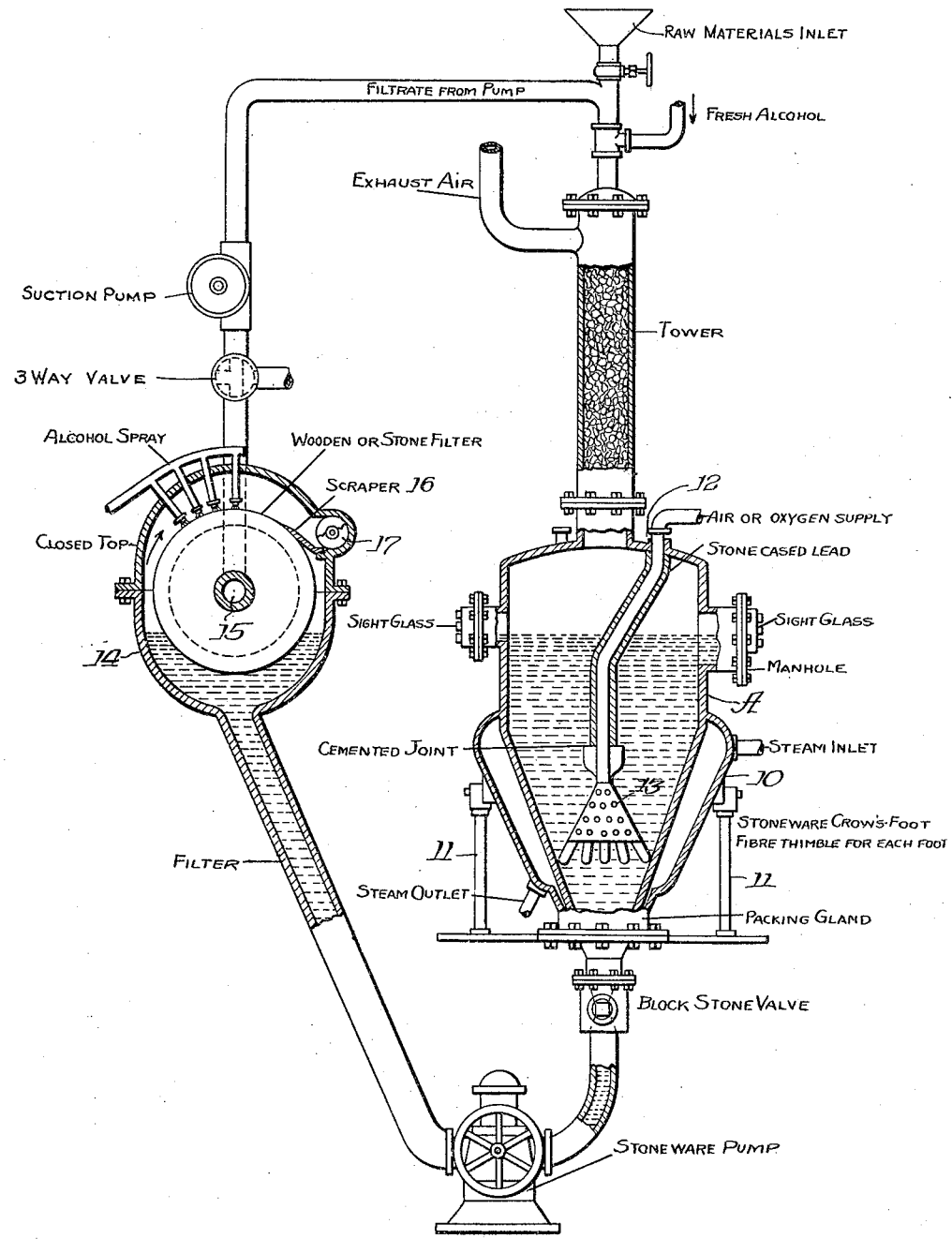

1,880,816

UNITED STATES PATENT OFFICE

ROBERT M. COLE, OF SANDUSKY, OHIO

APPARATUS FOR MAKING DYES OR THE LIKE

Original application filed November 24, 1926, Serial No. 150,556, Patent No. 1,694,057, dated December 4, 1928. Divided and this application filed November 1, 1928. Serial No. 316,526.

This invention relates generally to apparatus for making dyes, more particularly triphenylmethane dyes so that the same may be continuously prepared.

My apparatus has particular utility in the practice of the process described in my application, Serial No. 150,556, filed November 24, 1926 now Patent No. 1,694,057, granted December 4, 1928 for process of makng dyes and apparatus therefor, of which this application is a division.

In the aforementioned application, where I have attempted to make dyes, particularly of the triphenylmethane series, using solid or liquid oxidizing agents, these methods have been discontinuous because the reaction was carried out in bulk processes, and/or because the process required separation of the reaction products, that is, the desirable end products as may be formed from the undesirable constituents as may be formed due to cumulative effects.

The aforementioned application has among the objects of the inventon the producton of dyes, particularly of the triphenylmethane series, by continuous methods and the utilization of oxidizing agents that are extremely cheap and easily available, particularly those which do not introduce factors requiring separation of reaction products as a result of cumulative effects of undesirable agents.

The said application describes as an object of the invention the provision of a process for the production of dyes, particularly of the triphenylmethane series, in which the final product is free from the cumulative effects of undesirable reaction products and which includes, in the practice thereof, the carrying out of the reaction in the presence of a solvent for the reacting materials, which is a poor solvent, at least, or a non-solvent for the final desirable end products.

This invention has for its object the provision of apparatus simple and inexpensive in structure and operation useful for carrying out the process disclosed in my application aforementioned for quickly and efficiently presenting the reacting ingredients for maximum production and substantially theoretical yield, and still further incorporates features whereby the intermediate ingredients, either partially or incompletely reacted, may be continuously added to a reaction chamber and the desirable end products withdrawn without interruption.

Other and further objects and advantages of this invention will appear from the more detailed description set forth below, it being understood that various changes may be made therein by those skilled in the art without departing from the scope and spirit of this invention.

Primarily this invention uses oxygen as the oxidizing agent in the presence of a catalyst. The oxygen is preferably obtained by using air although other oxygen containing agents may be used in which the oxygen is available in the gaseous state. Two processes may be distinguished: first, those in which the reactions of condensation and oxidation take place simultaneously; and second, those in which desired amines are condensed in one step and the oxidation of such condensation products with other amines is carried out in a separate step. The processes are desirably carried out in the presence of a solvent for the reacting materials which is a poor solvent, at least, or a non-solvent for the final products.

The following example will illustrate the preferred form of the process as applied in the manufacture of diphenylamine blue, it being understood that the process may be adapted to the manufacture of other triphenylmethane dyes by choice of the ingredients necessary to produce such dyes. In this preferred process, diphenylamine, hydrochloric acid, an aldehyde such as formaldehyde and air are run continuously into a reaction still in which cupric chlorid is contained in alcoholic solution. The temperature may vary within a wide range but the optimum range is between 65 and 75° C. The reacting materials are all soluble in alcohol but the diphenylamine blue being but very slightly soluble in that solvent, after the process has been running a short time the alcohol becomes saturated with the dye and from that time on the dye precipitates as rapidly as it is formed. The reaction liquid is continuously withdrawn from the still and filtered to remove the precipitated dye, the filtrate containing the unfinished and raw materials in solution being pumped back continuously into the reaction chamber. For the best results, for each molecular weight of formaldehyde and hydrochloric acid entering into the reaction, there should be present three molecular weights of diphenylamine. Further, the water content of the alcoholic medium should be kept below 10% and preferably between 4 and 6% in order that the hydrochloric acid present may function properly as a condensing agent. The dye is precipitated as the hydrochlorid salt in yield of approximately 100% of the theoretical but approximately 95% purity.

Instead of conducting the condensation and oxidation reaction simultaneously, the condensation may be carried out as an initial step, for example, by the production of such a derivative as diethyldibenzyldiaminodiphenylmethane, followed by reaction of the condensation product with diphenylamine, for example, by the oxidation of the mixture of these amines with air in the presence of a catalyst. In place of the amines, the amino sulphonic acid and other derivatives may be utilized. While alcohol has been given as the specific solvent, other solvents for the reacting materials but which do not materially dissolve the finished product may be used, particularly one having the right boiling point for the optimum reacting temperature and where amines are used as bases, one which will serve as a good solvent for the amines and bases and prevent their hydrolysis as salts and at the same time exert poor solvent action on the dye stuff. It is also desirable to have the solvent at the same time inert to the oxidation and of as low cost as possible. While alcohol is preferably used, acetone and ethylacetate may be used. Many of the triphenylmethane dyes, particularly those of the rosaniline and pararosaniline types may be made by a strictly analogous process. The process is preferably carried out with the triphenylmethane group and type which includes cases where naphthyl or other groups are sometimes used or occur in place of the phenyl groups, and I consider this process particularly adapted to the formation of Victoria blue, in which case a diphenylnaphthylmethane type is obtained.

To attain the objects of my invention as particularly applicable to my apparatus, and such further objects as may appear herein or be hereinafter pointed out, I make reference to the accompanying drawing forming a part hereof in which:

The figure represents an end elevation partially in section, with parts broken to disclose the interior of a general assembly of my reaction apparatus.

The apparatus comprises generally a reaction still A having as a lower portion an inverted, truncated cone, said truncated cone portion being provided with a steam jacket 10, the still being suitably supported upon standards 11. Leading from the lowermost portion of the cone-shaped portion of the still I connect the apparatus to a stoneware pump, interposing therebetween a suitable chemically resistant valve preferably made of block stone.

The upper portion of the reaction still is provided at diametrically opposite points with sight glasses to maintain the liquid level at the desired point and for other observation purposes. Upwardly disposed of the reaction still, a reaction tower is provided containing suitable conducting materials, such as pebbles. The tower has a main inlet and a bi-passed pipe member which will be hereinafter described in greater detail.

Downwardly disposed into the reaction still I provide a gaseous agent supply duct 12 at whose terminus I provide a crowsfoot as identified, having suitable orifices 13, and a plurality of fibre thimbles supporting the crowsfoot in the tapering portion of the still. The gaseous agent duct is preferably made of such resistant material as lead and covered superficially with some chemically resistant material, such as stone, enamel or the like.

The outlet from the stoneware pump previously described is directed to a filter comprising a main housing 14 in which is rotatably disposed a porous filter made of wood, stone or other suitable material. A rotary filter of the type mentioned is arranged for centrally withdrawing liquid material through the pipe member 15, acting as a shaft for the filter as well as withdrawal means. This shaft is suitably mounted in bearings (not shown). The solids are removed from the periphery of the filter and for this purpose I provide a scraper 16 engaging the filter tangentially when rotated in a clock-wise direction, as viewed. In combination with the scraper I provide a screw conveyor 17, suitably rotated for continuously removing the material deposited upon the scraper.

For more completely separating the solid material from the filtrate I provide the upper portion of the filter housing with suitable solvent sprays which are arranged to direct the solvent material upon the solid components just prior to their separation by the scraper previously described.

In its preferred form, the raw materials are added through the main inlet which, in the drawing, is legend "filtrate from pump" and these may be the diphenylamine, hydrochloric acid and aldehyde. These ingredients may, at the commencement of the reaction, be in water solution or in an organic solvent, such as alcohol. In the reaction still I add the catalyst, such as cupric chlorid, in an alcoholic solution. As the raw materials descend into the reaction still, the gaseous agent duct has forced therethrough the gaseous agent, such as oxygen, either molecular or nascent, in the form of air, oxygen or ozone to bubble the agent through the fluid in the still. Where air or oxygen is the gaseous agent, it is preferred to circulate from 500 to 1000% of the theoretical amount of the air or oxygen needed for the reaction through the gaseous agent duct. As mentioned in connection with the process previously described, the steam jacket serves to maintain the proper temperature conditions for the reaction zone in the liquid phase.

Upon contact of the reaction ingredients and the gaseous agent, a precipitate which includes the dye is formed and is kept well stirred by suitable stirring means or by reason of the bubbling gaseous ingredients until it settles past the crowsfoot and escapes through the valve below. The precipitate and the filtrate, including the solvent and partially reacted materials, are circulated and forced upwardly to the rotary filter, being deposited upon the periphery of the drum and finally washed by the spray and scraped from the drum and removed by the scraper. The filtrate passing through the pipe 15 may be disposed of but is preferably led back to the main inlet legend "filtrate from pump". In this manner, so far as the ingredients formed directly in the main reaction still are concerned, the process may be continuous. Rising from the reaction still is a certain amount of the gaseous agent and the solvent in the vapor form and as they flow upwardly reaction by contact is obtained as the ascending gaseous material and vapor contact with the counter current of descending fresh material or filtrate from the pump to give reaction by contact in the tower. The gaseous agent which is unreacted and which may contain vapors of the solvent is drawn off at the upper portion of the still at the point as marked "exhaust air" and is thereafter passed through an economizer for recovering its gaseous agent, vapor or heat value. Any precipitated dye thus formed in the tower is gradually washed down into the main reaction zone and accumulated until it settles past the crowsfoot.

As previously described, the solvent medium is maintained at certain predetermined concentrations and where I use alcohol this is preferably maintained between 4-6% of water and below 10%. The concentration of the organic solvent medium is maintained to prevent undue dilution and its content may be augmented by addition at any point in the apparatus. Preferably this addition is made through the by-pass portion legended "fresh alcohol". The amount of alcohol added is in accordance with dilution resulting from the incorporation of water by the addition of raw materials as a result of their reaction. The preferred concentration may be maintained by displacing the weakened solvent or by fractional distillation for purposes of concentration or by enrichment by the addition of a higher concentration of solvent. In the case where alcohol is used as a solvent, the preferred concentration may be maintained by fractionally distilling the alcohol and enrichment by the addition of absolute alcohol or displacement of the partially purified content with an absolute content. The modification of the solvent to maintain the preferred concentration is calculated upon the weight of the dye which is obtained from the reacting ingredients and the incorporation of the raw ingredients entering into the reaction.

It will be observed that the apparatus above described is useful for carrying out the process of condensation and oxidation simultaneously, and though this is preferred, it is also suitable for carrying out the condensation as an initial step. The fresh materials as added and at the points described may be intermediate products of a derivative such as diethyldibenzyldiaminodiphenylmethane and diphenylamine, the oxidation being carried out as described in the process above with the gaseous ingredient, such as air, in the presence of a catalyst.

It will be observed that though I have described a source of oxygen for carrying on the oxidation step as preferably obtainable from the atmospheric oxygen as air, and as an added ingredient in a gaseous form, it will be understood that I may add oxygen containing agents in which oxygen is available in the gaseous state and capable of being liberated in situ for performing its desired function. Oxygen, either molecular or nascent and generated by any method, may be used and this includes air, oxygen, ozone, etc. It is preferred that the vehicle containing the available oxygen be an agent which will not introduce an objectionable component in the batch or the desired end product.

It will also be observed that though I have described an aldehyde as the source of the methane carbon atom in the formation of the triphenylmethane dye and more specifically described formaldehyde for this purpose, I may sometimes use carbonyl chloride (phosgene). It will be observed that by the preferred process described a theoretical yield is obtained and as a result I procure a dye of almost perfect quality unaffected in tinge, fastness of color and similar lasting properties, as a result of impurities normally accompanying the dye when made by heretofore known processes. In the case of aniline blue, the product made by my process is vastly superior to aniline blue made by the rosaniline process in that it is purer, the shade is constant or uniform and the strength greater.

Having thus described my invention and illustrated its use, what I claim as new and desire to secure by Letters Patent, is—

1. Apparatus for preparation of dyes comprising in combination a still including liquid phase reaction zone chamber, means for heating said still adjacent said chamber and means to conduct a gaseous agent comprising an oxidizing agent to said zone, a filter for separating the reaction products, and means to return liquid ingredients to said chamber free from solid reaction products.

2. Apparatus for preparation of dyes comprising in combination a still including a liquid phase reaction chamber and a vapor phase reaction zone comprising a tower in gravitational relationship to said chamber, circulating means for the reacting ingredients and means for counter-currently distributing a gaseous agent comprising an oxidizing agent in reference to the liquid ingredients in said chamber.

3. Apparatus for preparation of dyes comprising in combination a still including a reaction zone chamber, means for feeding liquid ingredients thereto, means for separating reaction ingredients and a connecting line for returning incompletely reacted ingredients to said reaction zone chamber and means for separating the solid components prior to the return of said incompletely reacted ingredients.

4. Apparatus for preparation of dyes comprising a still including a liquid phase reaction zone chamber, a vapor phase reaction zone comprising a tower connected therewith and positioned to gravitationally feed materials to said first zone, circulating means for directing the liquid ingredients from said liquid phase reaction zone chamber to said vapor phase reaction zone tower including filter means disposed therebetween, and means to conduct a gaseous agent counter-currently to said circulating means.

5. Apparatus for preparation of dyes comprising a still including a liquid phase reaction zone chamber, a tower for causing a vapor phase reaction from the vapors of said still, disposed to gravitationally feed the first zone, means to return said feed said liquid to said tower from said still including filtering means interposed between said chamber and tower and means for counter-currently feeding air to said still and tower.

6. Apparatus for preparing dyes comprising a still including a liquid phase reacting zone chamber, means for heating said still adjacent said chamber, a tower disposed to receive the ascending vapors from said chamber, means to return the liquid from said still to said tower counter-currently to said ascending vapors, including interposed filtering means for the solids carried thereby, and means to feed air to said still into the liquid within said first zone.

7. Apparatus for the preparation of dyes comprising in combination a still including a chamber for liquid phase reaction comprising a tower, a conducting line for leading liquid ingredients thereto and connected to gravitationally feed the liquid ingredients to said chamber, a pipe line for leading reacted ingredients therefrom, circulating means in said last mentioned line, a filtering device for separating the solid components and conducting means from said filtering means for returning the incompletely reacted filtrate to said first mentioned chamber, said chamber including a sealed pipe line for conducting air to the chamber.

In testimony whereof I have hereunto signed my name.

ROBERT M. COLE.